(12) United States Patent
Mizutani et al.

(10) Patent No.: US 6,319,162 B1
(45) Date of Patent: Nov. 20, 2001

(54) SLIDING KEY AND CONTINUOUSLY VARIABLE TRANSMISSION

(75) Inventors: Tamaki Mizutani, Inabe-gun; Masahiko Mizutani; Masashi Watanabe, both of Iwata; Yukitoshi Ogawa, Nagoya, all of (JP)

(73) Assignees: NTN Corporation, Osaka; Aichi Machine Ind. Co. LTD, Aichi, both of (JP)

( * ) Notice: Subject to any disclaimer, the term of this patent is extended or adjusted under 35 U.S.C. 154(b) by 0 days.

(21) Appl. No.: 09/508,588
(22) PCT Filed: Aug. 5, 1999
(86) PCT No.: PCT/JP99/04223
§ 371 Date: Jun. 5, 2000
§ 102(e) Date: Jun. 5, 2000
(87) PCT Pub. No.: WO00/08347
PCT Pub. Date: Feb. 17, 2000

(30) Foreign Application Priority Data
Aug. 7, 1998 (JP) .............................................. P10-223798

(51) Int. Cl.$^7$ ........................... F16H 59/00; F16H 61/00; F16H 63/00; F16H 9/12
(52) U.S. Cl. ..................................... 474/42; 29/892; 474/35
(58) Field of Search .................................. 474/42, 35, 34; 29/892

(56) References Cited

U.S. PATENT DOCUMENTS
4,075,902 * 2/1978 Charchian et al. ............... 74/230.17

OTHER PUBLICATIONS
Patent Abstract of Japan, 08219258, Aug. 27, 1996.
Patent Abstract of Japan, 1–169650, U1, Nov. 30, 1989.
Patent Abstract of Japan, 10026198, Jan. 27, 1998.

* cited by examiner

Primary Examiner—Sherry Estremsky
Assistant Examiner—Tisha D. Lewis
(74) Attorney, Agent, or Firm—Hedman & Costigan, P.C.

(57) ABSTRACT

A sliding key slidable in an axial direction of a rotary shaft and engaging a sliding cylinder such that the sliding key follows a rotation of the sliding cylinder. The sliding key is a molded product of a metal-molded part and a resinous part. The sliding key does not malfunction or fail when it is used in an environment of a high temperature and a high load.

3 Claims, 4 Drawing Sheets

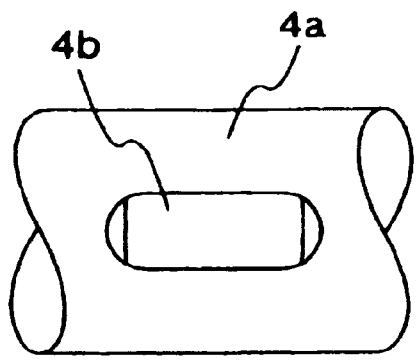
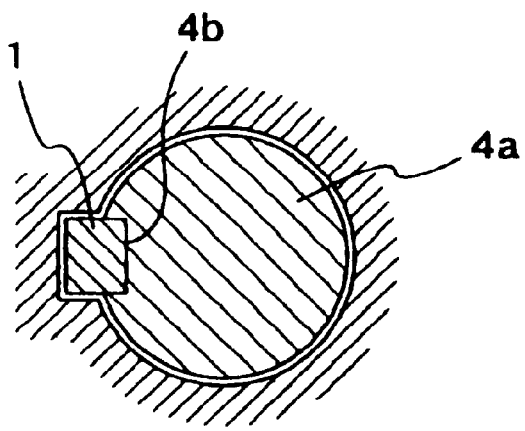
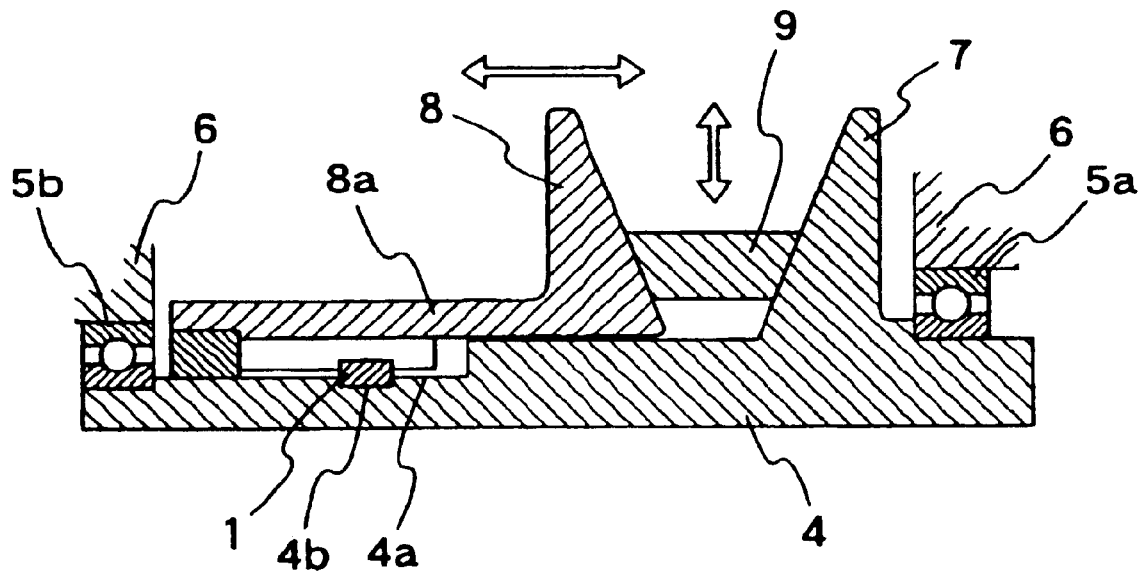

SLIDING KEY AND CONTINUOUSLY VARIABLE TRANSMISSION

TECHNICAL FIELD

The present invention relates to a sliding key that consists of a composite molded product made of a metal-molded part and a resinous part and can be suitably used in a severe environmental condition of a high temperature and no lubrication and a continuously variable transmission using the sliding key.

BACKGROUND ART

As a construction of a continuously variable transmission using a sliding key, the pulley construction is known in which a stationary key rotating with a rotary shaft and a movable pulley having a sliding cylinder are engaged each other through the sliding key (Japanese Patent Application Laid-Open No. 8-219258).

With reference to FIGS. 4 and 5, the conventional pulley construction of the continuously variable transmission is described below. FIG. 4 is a half-sectional view showing the pulley construction in the axial direction of the rotary shaft. FIG. 5 is a perspective view showing a main portion of the rotary shaft.

A rotary shaft 4 that is driven by an engine not shown is supported on a body 6 of the continuously variable transmission by bearings 5a, 5b. A stationary pulley 7 is formed integrally with the rotary shaft 4 such that the stationary pulley 7 projects outward from the rotary shaft 4. Grooves 4b are formed concavely into the periphery of a stepped portion 4a formed on the periphery of the rotary shaft 4 such that the grooves 4b are long in the longitudinal direction of the stepped portion 4a and spaced at regular intervals in the circumferential direction thereof. A sliding key 1 is fitted into the groove 4b and engages a movable pulley 8 having a slidable cylindrical portion 8a, such that the movable pulley 8 operates in contact with the stationary pulley 7 or separably therefrom. The sliding key 1 that is fitted into the groove 4b is required mainly to have a rotation-stopping function or a power-transmitting function. The sliding key 1 is also required as an additional function to have a reciprocating function in the axial direction of the rotary shaft 4. Referring to FIG. 4, reference numeral 9 denotes a V-belt spanned between the stationary pulley 7 and the movable pulley 8.

The sliding key 1 is hitherto formed of metal or a material having a low friction coefficient. As the material having a low friction coefficient, a mixture of polyimide resin, polytetrafluoroethylene resin, and graphite or a mixture of polyetherether ketone resin, carbon fiber, and polytetrafluoroethylene resin is used.

However, in the case where the groove into which the sliding key is fitted is made of metal, sliding contact occurs between the metal of the sliding key and that of the groove. Thus, when the sliding key is used in an environment of a high temperature and a high load, the friction resistance of the sliding key becomes large owing to friction-caused seizing of the metals or corrosion. As a result, the sliding key malfunctions or fails. Using a ball spline construction instead of metal leads to a complicated construction and a high cost.

A conventional sliding key made of a resinous material having a low friction coefficient melts, deforms or has a high friction resistance, when it is used in an environment of a high temperature and a high load. Consequently, it is destroyed in a short period of time.

The present invention has been made to overcome the problem. Thus, it is an object of the present invention to provide a sliding key that does not malfunction or fail when it is used in an environment of a high temperature and a high load and also provide a continuously variable transmission using the sliding key.

DISCLOSURE OF THE INVENTION

The sliding key of the present invention that engages a sliding cylinder with sliding in an axial direction and follows a rotation of a rotary shaft comprises a composite molded product made of a metal-molded part and a resinous part.

The resinous part forming an integral molded product consists of an injection-moldable resinous composition.

The continuously variable transmission of the present invention includes a stationary pulley rotating with a rotary shaft having a plurality of grooves formed on a peripheral surface thereof at appropriate intervals in a circumferential direction thereof and having a sliding key fitted into each of the grooves; and a movable pulley having a sliding cylinder having a plurality of grooves each of which has a width to receive the sliding key and extends axially on an inner peripheral surface thereof such that the grooves are located at appropriate intervals in correspondence to the grooves formed on the peripheral surface of the rotary shaft. The sliding key is the sliding key of the present invention.

The sliding key of the present invention is a composite integral molded product of the metal-molded part and the resinous part. Thus, when the sliding key is used in an environment of a high temperature and a high load, it does not malfunction or fail. Further, because the resinous part is made of the injection-moldable resinous composition, it is easy to form the sliding key having a complicated configuration or construction. Therefore, the sliding key of the present invention is smaller, lighter, and lower in cost than a ball spline conventionally used.

Because the continuously variable transmission of the present invention uses the sliding key, it is allowed to have a simple construction and a smooth operational performance in an unlubricated atmosphere.

BRIEF DESCRIPTION OF THE DRAWINGS

FIG. 3A shows a rotary shaft into which a sliding key is fitted.

FIG. 3B is a sectional view showing the rotary shaft in its diametrical direction.

FIG. 4 is a half-sectional view showing the construction of a pulley in the axial direction of the rotary shaft.

BEST MODE FOR CARRYING OUT THE INVENTION

Figure 1A:
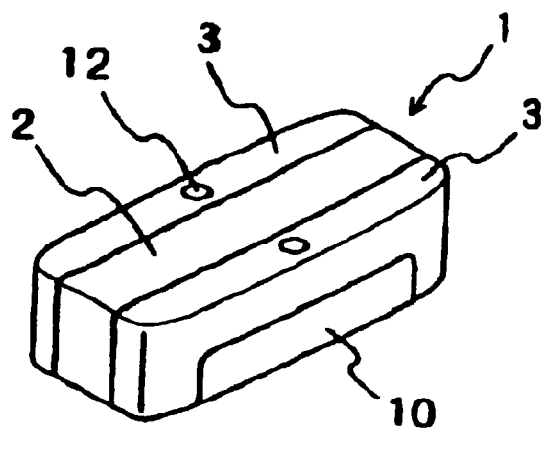
FIG. 1A is a perspective view entirely showing an example of a sliding key.
Figure 1B:
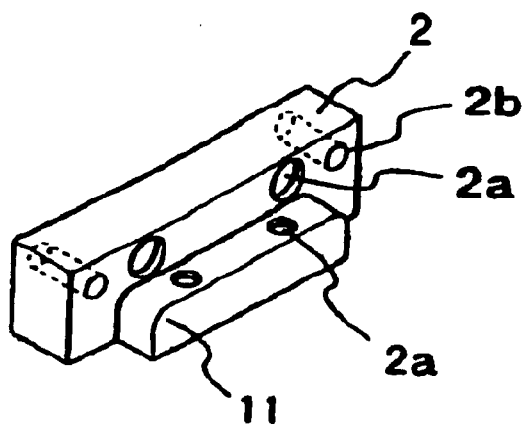
FIG. 1B is a perspective view showing a metal-molded part.
Figure 2A:
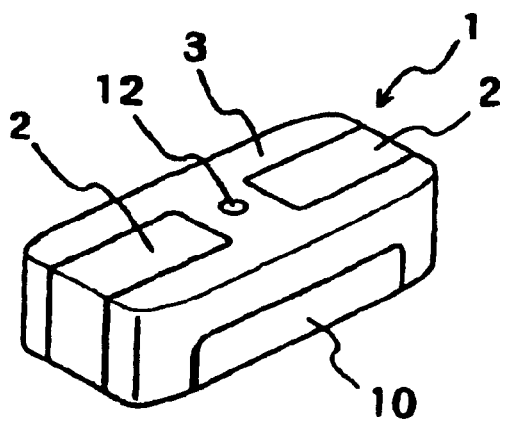
FIG. 2A is a perspective view entirely showing another example of a sliding key.
Figure 2B:
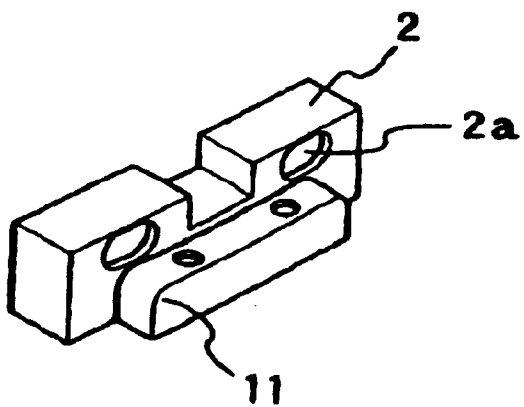
FIG. 2B is a perspective view showing another metal-molded part.
Figure 5:
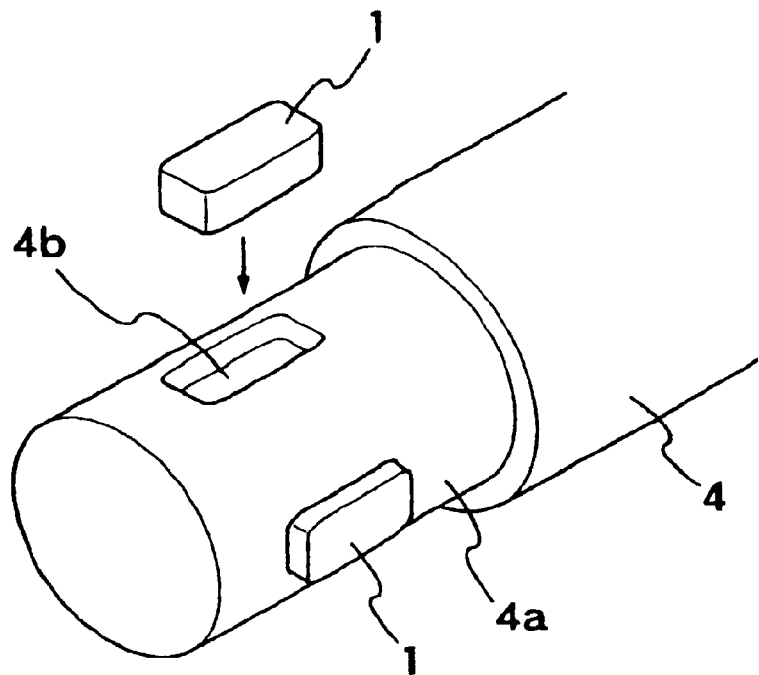
FIG. 5 is an exploded perspective view showing a main portion of the rotary shaft.

The sliding key of the present invention will be described below with reference to FIGS. 1A through 2B. FIGS. 1A and 2A are perspective views each showing a sliding key entirely. FIGS. 1B and 2B are perspective views each showing a metal-molded part entirely.

A sliding key 1 consists of a metal-molded part 2 and a resinous part 3. The resinous part 3 is formed integrally with the metal-molded part 2, using integral molding.

The sliding key 1 is so configured that it can be fitted into a groove 4b formed on the periphery of a stepped portion 4a of a rotary shaft 4 shown in FIG. 3 that will be described later and is not dislocated against a load axially applied thereto. Preferably, the sliding key 1 is also so configured that a part thereof being fitted into the groove 4b is formed of a metal-molded part 2 and that a part thereof sliding on a groove formed on the inner periphery of a slidable cylindrical portion 8a is formed of a resinous part 3. By forming the fit-in part of the metal-molded part 2, the fit-in force of the sliding key 1 can be improved. By forming the sliding part of the resinous part 3, the performance of the sliding contact between the slidable cylindrical portion 8a and the rotary shaft 4 can be improved.

As the metal-molded part 2, it can be used machined products, forgings, lost wax products, sintered metal products, and metal-injected products. Of these products, the lost wax products are more favorable than other products because the lost wax products are reliable in strength and inexpensive. To prevent the surface of the metal-molded part 2 from being corroded, it is preferable to plate on its surface.

It is preferable that the metal-molded part 2 is so configured that the resinous part 3 and the metal-molded part 2 are not separable from each other during operation of a continuously variable transmission. Specifically, as shown in FIGS. 1B and 2B, a groove 2a and a through-hole 2b are formed on the metal-molded part 2. Owing to the formation of the groove 2a and the through-hole 2b, in performing integral molding, the resinous part 3 is filled into the groove 2a and the through-hole 2b to form a composite product of the resinous composition and the metal. Therefore, the sliding key 1 of the present invention can be formed as a rigid integral molded product without using an adhesive agent. A corner 11 of the metal-molded part 2 has a radius to flow resin easily.

As the resinous composition forming the resinous part 3, it is possible to use resinous compositions that can be molded integrally with the metal-molded part 2. As the molding method, injection molding, compression molding, and transfer molding can be used. An injection-moldable resinous composition is preferable because it can be easily processed into the resinous part 3 even though the metal-molded part 2 has a complicated configuration.

As the injection-moldable resinous component, it is possible to use thermoplastic polyimide resin, polyetherketones such as polyetheretherketone resin and polyetherketone resin, polyacetal resin, polyamide resin, polyethylene resin, polyamide-imide resin, polyethernitrile resin, aromatic polyester resin, and polyphenylene sulfide resin. These resins can be used singly or as a polymer alloy or a polymer blend consisting of two or more of the resins.

Of these resins, resin containing both the thermoplastic polyimide resin and the polyetherketones as its main component is preferable because the resins allow formation of the sliding key having a high degree of mechanical strength and sliding performance.

Regarding the thermoplastic polyimide resin, as shown in a formula (I), imide resin has a structure in which imide groups superior in thermal characteristic and mechanical strength bonded with aromatic groups. Further, the imide resin has a plurality of ether linkages indicating appropriate melting characteristic upon application of energy such as heat. The thermoplastic polyimide resin having two ether linkages in a repeating unit is preferable because it satisfies required mechanical characteristic, rigidity, heat-resistant property, and injection-moldability.

Formula (I)

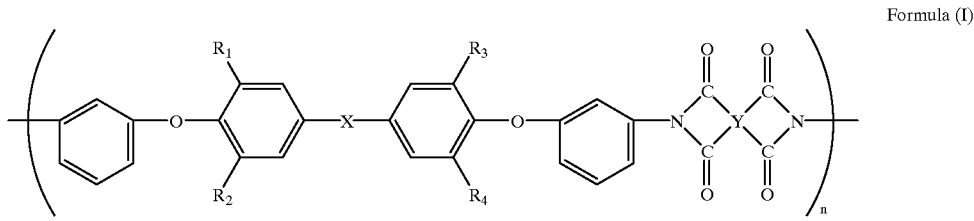

(in the formula(I), X is none, namely two phenyl groups bonded directly, or a group selected from hydrocarbon group having 1–10 carbon atoms, isopropylidene group, carbonyl group, thio group, and sulfone group; $R_1$–$R_4$ is hydrogen, lower alkyl group (preferably, 1–5 carbon atoms), lower alkoxy group (preferably, 1–5 carbon atoms), chlorine or bromine ($R_1$–$R_4$ may consist of the same group or different groups); Y indicates tetravalent group selected from aliphatic group, cyclic aliphatic group, monocyclic aromatic group, condensed polycyclic aromatic group, polycyclic aromatic group in which aromatic groups are bonded to each other directly or through cross-linking group.)

As such thermoplastic polyimide resin, it is possible to use a product in the trade name of AURUM of Mitsuitoatsu Kagaku Co., Ltd. in which the $R_1$–$R_4$ of formula (I) consists of hydrogen.

The polyetherketone resin has a repeating unit shown by a formula (II) shown below or has both the repeating unit of the formula (II)and a repeating unit shown by a formula (III) shown below to such an extent that the characteristic of the polyether ketone resin is not lost.

Formula (II)

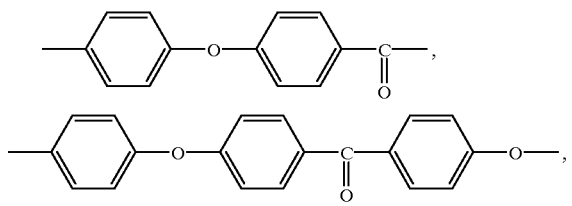

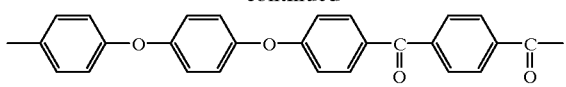

Formula (III)

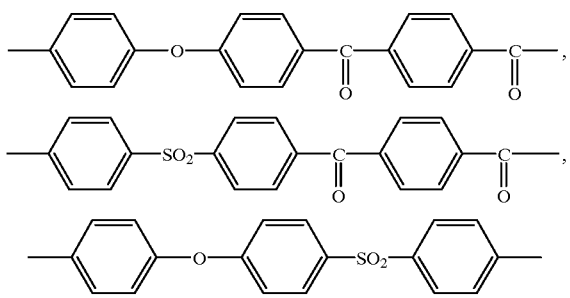

As commercially available products of the polyetherketone resin, PEEK150P (VICTREX Inc., trade name), PEK220G (ICI Inc., trade name), and UltrapekA2000 (BASF Inc., trade name) can be used.

It is possible to add, to the resinous composition composing the resinous part 3, solid lubricant such as tetrafluoroethylene resin, graphite, molybdenum disulfide, tungsten disulfide, graphite fluoride, boron nitride, and silicon nitride; a reinforcing material such as glass fiber, carbon fiber, and whisker; and a filler such as calcium carbonate, clay, and mica.

In the injection molding method of the present invention, the sliding key is obtained by injecting the resinous composition into a die containing the metal-molded part 2. Depending on the configuration of the metal-molded part 2, it is possible to adopt one-point gate method or multi-point gate method. For example, for the sliding key shown in FIGS. 1A and 1B, it is preferable to use two-point gate method. Integral molding of the sliding key shown in FIGS. 2A and 2B can be accomplished by one-point gate method.

The continuously variable transmission of the present invention is characterized in that it has the above sliding key. The use state of the sliding key is shown in FIGS. 3A and 3B. FIGS. 3A and 3B show the rotary shaft into which the sliding key is fitted. FIG. 3A is a perspective view showing the stepped portion 4a of the rotary shaft. FIG. 3B is a sectional view showing the rotary shaft into which the sliding key is fitted.

In FIG. 3A, the groove 4b is formed concavely into the periphery of the stepped portion 4a formed on the periphery of the rotary shaft such that the groove 4b is long in the longitudinal direction of the stepped portion 4a. The groove 4b is formed on the stepped portion 4a at one position thereof or preferably, at several positions thereof at regular intervals in the circumferential direction thereof. The sliding key 1 is fitted into the groove 4b and engages the sliding cylindrical portion (FIG. 3B).

In the continuously variable transmission of the present invention, each of other constituent elements thereof may have the same construction as that of the conventional one shown in FIG. 4, except the sliding key. Example 1 through example 4 and comparison examples 1 and 2.

As the resinous composition, a thermoplastic polyimide resinous composition (Bearee PI5010: trade name made of NTN engineering plastics Corporation) and a polyetherketone resinous composition (Bearee PK5900: trade name made of NTN engineering plastics Corporation) were prepared. As the metal-molded part, surface-plated machine parts having configurations same as those shown in FIGS. 1A and 2A were prepared.

The metal-molded part was placed in the cavity of the die and injection molding was performed in an injection molding condition (thermoplastic polyimide resinous composition: pressure; 255 Mpa, temperature; 410° C., polyetherketone resinous composition: pressure; 255 Mpa, temperature; 380° C.). As a result, a sliding key that was a composite integral molded product of the metal-molded part and the resinous part and having the configuration shown in FIGS. 1A and 2A was obtained.

As shown in FIGS. 3A and 3B, to fit the sliding key having the resinous part into the corner-rounded groove 4b formed on the stepped portion 4a, both ends of the sliding key in the axial direction thereof were machined into the same configuration as that of the groove 4b to prevent the sliding key from dislocating against a load allied thereto in the axial direction of the rotary shaft.

Figure 6:
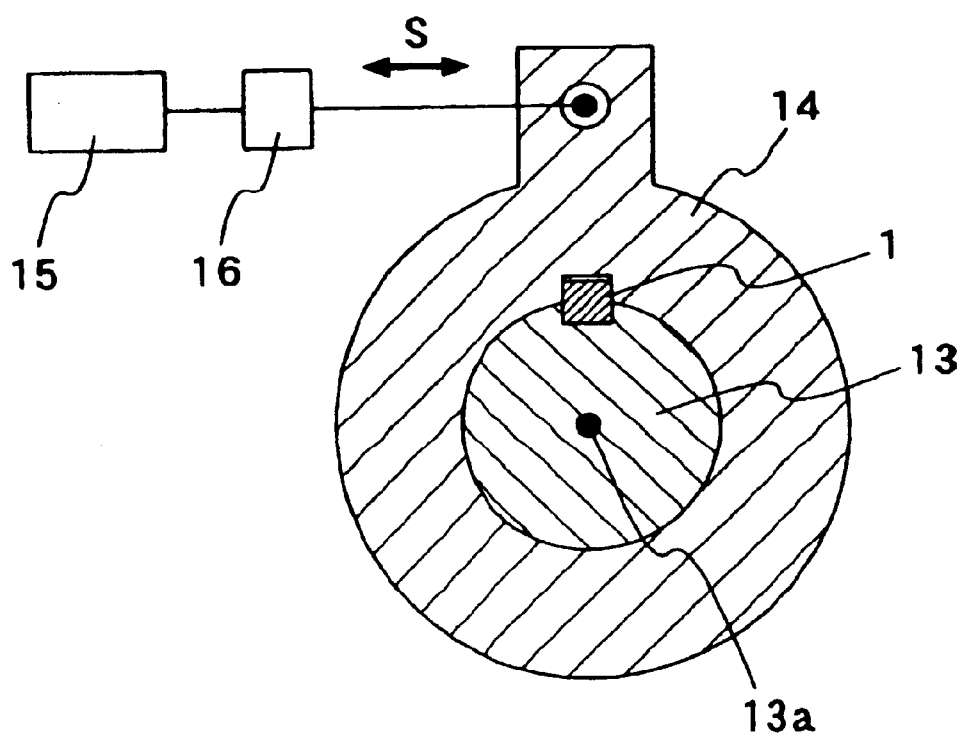
FIG. 6 shows a repeating shearing fatigue testing machine.
Figure 7:
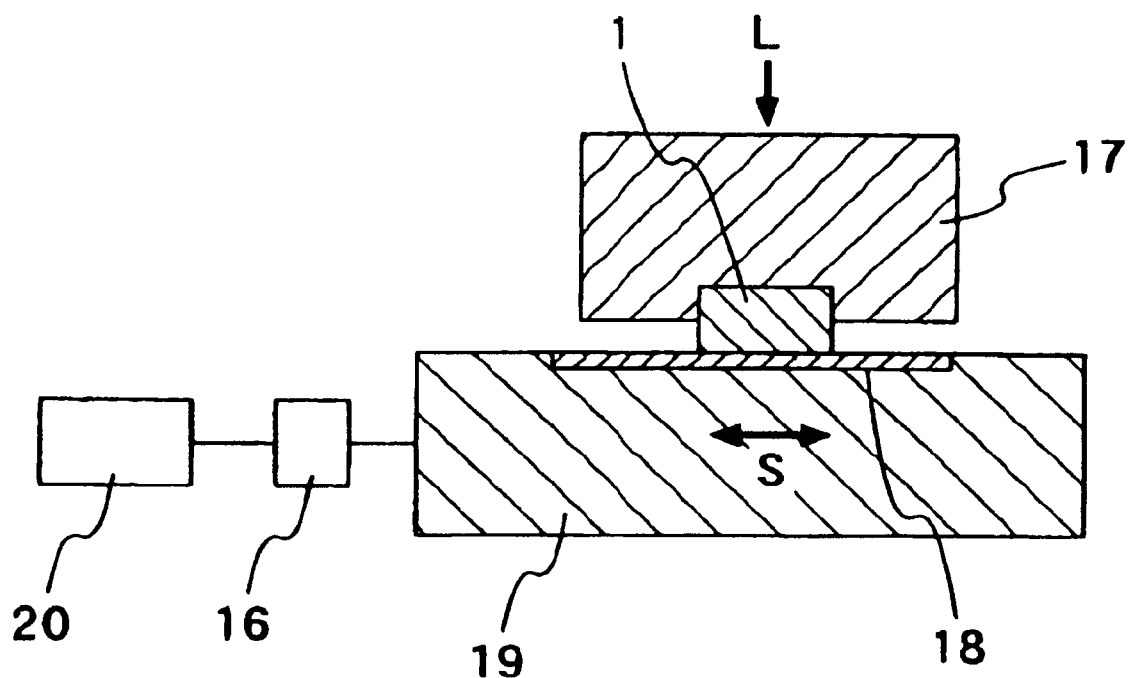
FIG. 7 shows a friction-testing machine.

The obtained sliding key was evaluated in a repeating shearing fatigue test and a friction test for measuring its friction coefficient. The repeating shearing fatigue test (FIG. 6) and the friction test (FIG. 7) were conducted in accordance with the NTN method. The evaluated result is shown in table 1. The result of comparison examples 1 and 2 was obtained by evaluating sliding keys formed by using the same method as that of example 1. However, to form the sliding keys, the thermoplastic polyimide resinous composition alone and the polyetherketone resinous composition alone were used respectively.

TABLE 1

| sliding key | | repeating shearing fatigue test load torque, | friction test (friction coefficient) face pressure, |
|---|---|---|---|
| configuration | resin | 50N · m | 47Mpa |
| Example 1 | FIG. 1 | PI | not less than 200,000 | 0.05–0.08 |
| Example 2 | | PEEK | not less than 300,000 | 0.2–0.3 |
| Example 3 | FIG. 2 | PI | not less than 150,000 | 0.05–0.08 |
| Example 4 | | PEEK | not less than 225,000 | 0.2–0.3 |
| comparison 1 | — | PI | not more than 50,000 | 0.05–0.08 |
| comparison 2 | | PEEK | not more than 75,000 | 0.2–0.3 | note) PI: thermoplastic polyimide resinous composition
PEEK: polyether ketone resinous composition As shown in table 1, the sliding key of example 1 through example 4 indicated repeating shearing fatigue characteristic values more than three times as great as that of the sliding keys made of the single resinous composition, respectively and indicated friction coefficients equal to those of the sliding keys made of the single resinous composition, respectively.

A continuously variable transmission as shown in FIG. 4 was assembled from the sliding key of example 1 and example 3. As a result, the continuously variable transmission did not have seizing and was not destroyed when they were used in an environment where temperature was about 110° C., load was 250 kgf, and sliding speed was 1.3 mm/sec.

INDUSTRIAL APPLICABILITY

The sliding key of the present invention is a composite integral molded product of the metal-molded part and the resinous part. Thus, when the sliding key is used in an environment of a high temperature and a high load, it does not have seizing or is not destroyed.

Further, because the resinous part is made of the injection-moldable resinous composition, it is easy to mold the resinous part integrally with the metal-molded part having a complicated configuration to form the composite integral molded product. Consequently, it is possible to obtain the sliding key superior in mechanical characteristic and low in cost.

Because the continuously variable transmission of the present invention uses the above-described sliding key, it is allowed to have a simple construction. Therefore, it is possible to obtain the continuously variable transmission compact, lightweight, and inexpensive.

What is claimed is:

1. A sliding key engaging a sliding cylinder with sliding in an axial direction and following a rotation of a rotary shaft comprising a composite molded product, said product is made of a metal-molded part and a resinous part.

2. A sliding key according to claim 1, wherein said resinous part consists of an injection-moldable resinous composition.

3. A continuously variable transmission comprising:

a stationary pulley rotating with a rotary shaft having a plurality of grooves formed on a peripheral surface thereof at appropriate intervals in a circumferential direction thereof and having a sliding key fitted into each of said grooves; and a movable pulley having a sliding cylinder having a plurality of grooves each of which has a width to receive said sliding key and extends axially on an inner peripheral surface thereof such that said grooves are located at appropriate intervals in correspondence to said grooves formed on said peripheral surface of said rotary shaft, wherein said sliding key is the sliding key of claim 1.

* * * * *